United States Patent
Langenhuizen

(10) Patent No.: US 7,733,745 B2
(45) Date of Patent: Jun. 8, 2010

(54) METHOD FOR CONTROLLING THE ROTATION OF OPTICAL DISC USING SPEED PROFILE AND HOLDING CIRCUIT

(75) Inventor: Theodorus Antonius Engelbertus Langenhuizen, Taipei (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 821 days.

(21) Appl. No.: 11/552,976

(22) Filed: Oct. 26, 2006

(65) Prior Publication Data
US 2008/0101173 A1    May 1, 2008

(51) Int. Cl.
*G11B 21/08* (2006.01)
(52) U.S. Cl. ............... 369/30.17; 369/30.15; 369/30.27
(58) Field of Classification Search ............... 369/30.27, 369/30.1, 30.11, 30.12, 30.13, 30.14, 30.15, 369/30.16, 30.17, 44.28
See application file for complete search history.

(56) References Cited

U.S. PATENT DOCUMENTS

| | | | | |
|---|---|---|---|---|
| 5,726,958 A * | 3/1998 | Min | ..................... | 369/30.13 |
| 6,606,282 B2 * | 8/2003 | Hung et al. | ............... | 369/30.15 |
| 6,606,283 B2 * | 8/2003 | Chan | ..................... | 369/30.15 |
| 6,785,197 B2 * | 8/2004 | Chao et al. | ............... | 369/30.15 |
| 7,218,579 B2 * | 5/2007 | Lin et al. | ................. | 369/30.13 |
| 7,336,568 B2 * | 2/2008 | Chang et al. | ............. | 369/30.17 |
| 7,382,697 B2 * | 6/2008 | Fujita | ..................... | 369/30.17 |
| 2002/0196715 A1 * | 12/2002 | Hung et al. | ............... | 369/30.16 |
| 2003/0031097 A1 * | 2/2003 | Chan | ..................... | 369/30.15 |
| 2003/0099166 A1 * | 5/2003 | Chan et al. | ............... | 369/30.17 |
| 2003/0206502 A1 * | 11/2003 | Lin | ..................... | 369/30.15 |
| 2005/0152245 A1 * | 7/2005 | Kao et al. | ................. | 369/30.13 |

\* cited by examiner

*Primary Examiner*—Tan X Dinh
(74) *Attorney, Agent, or Firm*—WPAT. P.C.; Justin King

(57) ABSTRACT

A motor control method for rotating an optical disc to be accessed by an optical head includes steps of: providing an increasing power to rotate a motor at increasing speed when a seeking operation of the optical head is performed; and interrupting the increasing power when a jumping operation of the optical head is performed.

2 Claims, 3 Drawing Sheets

METHOD FOR CONTROLLING THE ROTATION OF OPTICAL DISC USING SPEED PROFILE AND HOLDING CIRCUIT

FIELD OF THE INVENTION

The present invention relates to a motor control method, and more particularly to a motor control method used in an optical storage drive. The present invention also relates to a motor control device.

BACKGROUND OF THE INVENTION

An optical disc 1 for storing data is configured as shown in FIG. 1. Data are recorded along spiral tracks 10, starting from the center of the optical disc 1 and ending at 5 mm from the edge of the optical disc 1.

For accessing data, the optical disc rotates and an optical head of the optical drive moves through the tracks of the optical disc. The optical disc may be rotated according to different control strategies. One of the control strategies to rotate the optical disc is so-called as a CAV (Constant Angular Velocity) method. The CAV method is commonly used in low-speed optical disc. According to the CAV method, the rotating angle per second is fixed, so the RPM (Round per Minute) of the optical disc is fixed as well.

Another strategy for controlling the rotation of an optical disc is a CLV (Constant Linear Velocity) method. The CLV method is advantageous to keep the data flow constant either in inner tracks or outer tracks. According to the CLV method, the data is read or written at a constant rate. For example, data can be read at a transmission speed of 300K per second by the CLV method. For achieving the purpose of constant read/write rate, the spindle motor of the optical disc for rotating the optical disc needs to change speeds all the time. The inner the track to be read, the higher the rotating speed of the spindle motor. Aside from the CLV method, the rotating speed of the spindle motor needs changing frequently in other non-CAV methods.

On the other hand, the optical head needs to move for seeking or jumping among tracks, as illustrated in FIG. 2. When an optical head 20 of an optical disc 2 is to move inwards for seeking tracks, e.g. move from an outer track 21 to an inner track 22, a certain level of power needs to be supplied to an actuator (not shown) to move a sled 201 where the optical head 20 is seated. Meanwhile, more and more power needs to be supplied to a spindle motor 23 for rotating the optical disc from the outer track 21 to the inner track 22 under the CLV control or non-CAV control. Therefore, undesired current spikes may occur on the power supply.

SUMMARY OF THE INVENTION

Therefore, the present invention provides a motor control method and device for reducing current spikes.

According to an embodiment of the present invention, a motor control method for rotating an optical disc to be accessed by an optical head includes steps of: providing an increasing power to rotate a motor at increasing speed when a seeking operation of the optical head is performed; and interrupting the increasing power when a jumping operation of the optical head is performed.

In an embodiment, the power to rotate the motor is kept constant when the jumping operation of the optical head is performed.

According to an embodiment of the present invention, a motor control method for rotating an optical disc to be accessed by an optical head includes steps of: driving the motor to rotate at a first speed when the optical head is disposed at a first position relative to the optical disc; driving the motor to rotate at a second speed higher than the first speed when the optical head is disposed at a second position relative to the optical disc, wherein a distance between the first position and the second position is smaller than a first threshold; and driving the motor to rotate at the first speed when the optical head is moving from the first position to a third position relative to the optical disc, wherein a distance between the first position and the third position is greater than a second threshold.

In an embodiment, the second threshold is equal to or greater than the first threshold.

In an embodiment, the motor control method further includes a step of driving the motor to rotate at a third speed higher than the first speed when the optical head is disposed at a fourth position relative to the optical disc, wherein a distance between the third position and the fourth position is smaller than the first threshold.

According to a further embodiment of the present invention, a motor control device for rotating an optical disc to be accessed by an optical head, includes a servo controller issuing a first speed profile including a speed rise of a motor, and issuing a hold signal when the optical head is performing a jumping operation; a hold circuit, in response to the hold signal, modifying the first speed profile into a second speed profile including a constant speed area; and a motor driver adjusting the rotation speed of the motor according to the second speed profile.

In an embodiment, the motor driver adjusts the rotation speed of the motor according to the first speed profile when the optical head is performing a seeking operation.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
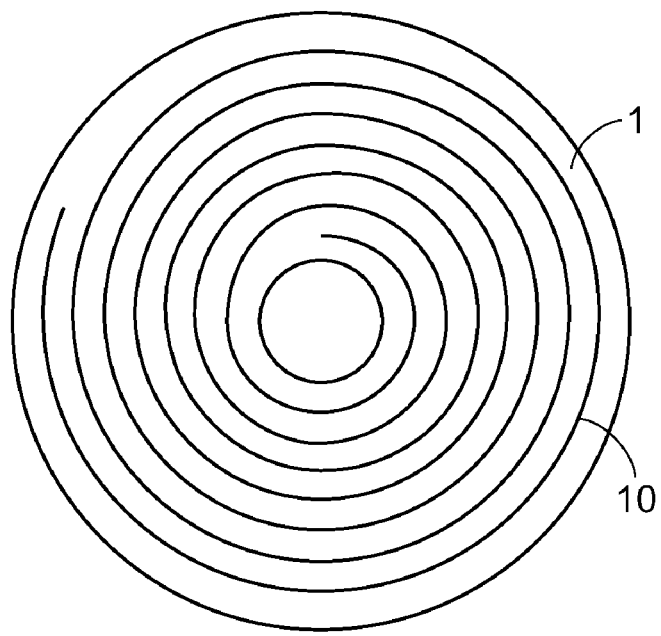
FIG. 1 is a schematic diagram showing a typical optical disc.
Figure 2:
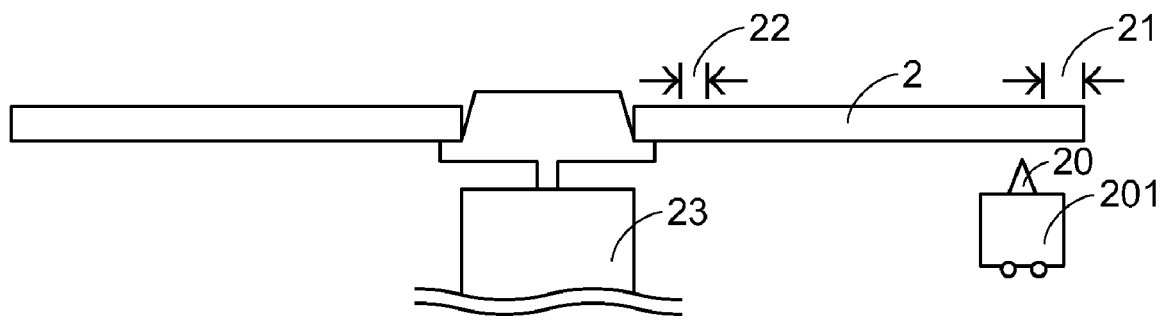
FIG. 2 is a schematic diagram showing means for accessing data recorded in the optical disc.
Figure 3:
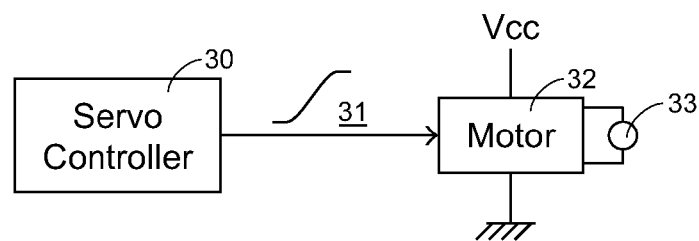
FIG. 3 is a functional block diagram illustrating a conventional motor control method for resulting in a preset speed profile.

Please refer to FIG. 3. In general, a servo controller 30 will issue a speed profile 31 to a motor driver 32 to determine driving current output to a spindle motor 33. For non-CAV control, the speed of the spindle motor does not remain constant and thus may rise with the inward movement of the optical head, as indicated by the speed profile 31. The rising of the motor speed is supported by increasing driving current. Therefore, when a long seeking operation is performed from an outer track to an inner track, the driving current for moving the sled as well as the optical head and the driving current for rotating the spindle motor need to be increased at the same time. As a result, current spikes are likely to happen. For reducing or even eliminating current spikes, the acceleration of the motor is staggered from the jumping of the optical head (and sled) according to the present invention.

Figure 4:
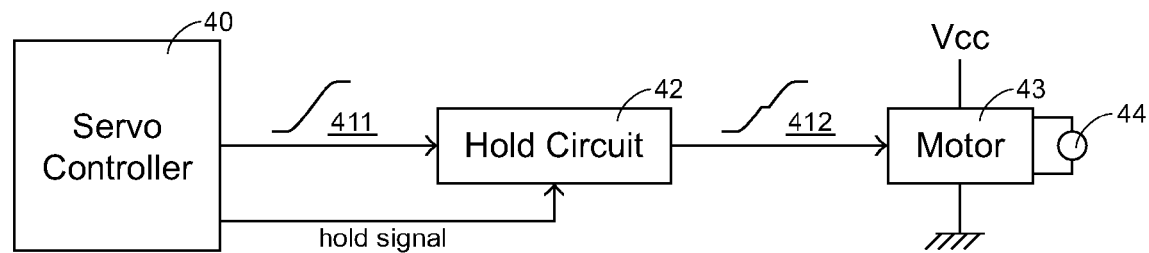
FIG. 4 is a functional block diagram illustrating a motor control method for resulting in a properly interrupted speed profile according to an embodiment of the present invention.

Please refer to FIG. 4. A hold circuit 42 is provided between a servo controller 40 and a motor driver 43 according to an embodiment of the present invention. A non-CAV speed profile 411 is issued by the servo controller 40 for controlling the driving current output to a spindle motor 44. When the hold circuit 42 is informed by a hold signal from the servo controller 40 that a long-distance movement or jumping of the optical head is going to be launched, the hold circuit 42 holds the speed profile 411 for certain duration. Accordingly, the motor driver 43 adjusts the driving current output to the spindle motor 44 according to the modified speed profile 412 instead of the speed profile 411. As the modified speed profile 412 stays in a constant speed area during the long-distance movement of the optical head, current spikes can be prevented or alleviated.

According to the above embodiment, the speed profile is modified to include a constant speed area when the optical head performs long-distance movement. The term "long distance" can be defined depending on practice. For example, one or more thresholds can be set to determine whether the distance is long. Basically, the "long distance movement" may indicate an actuator-jumping action of the sled and the optical head for performing a long seeking operation. Conclusively, when the optical head does not move significantly, i.e. the distance that the optical head moves is smaller than a threshold, the spindle motor is accelerated as previously scheduled. On the other hand, when the optical head jumps with a distance greater than the threshold or another threshold, the acceleration of the spindle motor is suspended, and restored after the jumping action of the optical head is completed.

Figure 5:
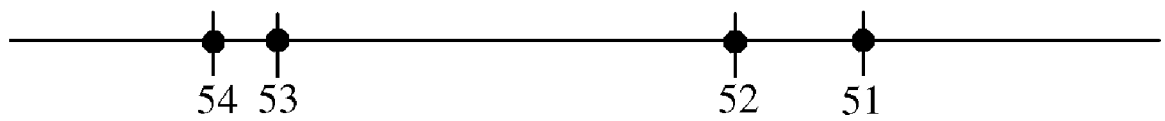
FIG. 5 shows different positions of the optical head.

Please refer to FIG. 5, which shows different positions of the optical head. In FIG. 5, first, the optical head is disposed at the first position relative to the optical disc and the disc is rotating at a first speed. Then the optical disc drive determines the movements of the optical head. When the optical head is moving from the first position 51 to the second position 52, i.e. short seeking operation, the rotating speed of the disc is accelerated to a second speed during the movement. The distance between the first position 51 and the second position 52 is smaller than a first threshold. When the optical head is moving from the first position 51 to the third position 53, i.e. long seeking operation, the rotating speed of the disc is maintained at the first speed during the movement. The distance between the first position 51 and the third position 53 is greater than a second threshold. Further, when the optical head is moved to the third position 53 and is moving from the third position 53 to the fourth position 54, the rotating speed of the disc is accelerated to a third speed. The distance between the third position 53 and the fourth position 54 is smaller than the first threshold. By maintaining the rotating speed of the disc during the long seeking operation, the current spikes are not happened.

According to the present invention, the speed-profile is held for several milliseconds, for example, causing an instantaneous drop in driving current. Furthermore, the adjustment of the driving current is preferably performed with a flywheel behavior, which will not introduce mechanical disturbances so as to smooth the action.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling the rotation of an optical disc to be accessed by an optical head, comprising steps of:

driving a motor to rotate the optical disc at a first speed when the optical head is disposed at a first position relative to the optical disc;

determining the movement of the optical head;

accelerating the motor to rotate the optical disc at a second speed higher than the first speed when the optical head is moving from the first position to a second position relative to the optical disc, wherein a distance between the first position and the second position is smaller than a first threshold; and maintaining the motor to rotate the optical disc at the first speed when the optical head is moving from the first position to a third position relative to the optical disc, wherein a distance between the first position and the third position is greater than a second threshold, wherein the second threshold is greater than the first threshold.

2. The motor control method according to claim 1 further comprising a step of driving the motor to rotate at a third speed higher than the first speed when the optical head is moving from the third position to a fourth position relative to the optical disc, wherein a distance between the third position and the fourth position is smaller than the first threshold.

* * * * *